United States Patent
Herder et al.

(10) Patent No.: US 6,772,478 B2
(45) Date of Patent: Aug. 10, 2004

(54) MINI-BALL BEARING CASTER

(75) Inventors: Jeffery A. Herder, R.R.1 Box 128, Hillview, IL (US) 62050; Larry B. Stepniak, Jacksonville, IL (US)

(73) Assignee: Jeffery A. Herder, Hillview, IL (US)

( * ) Notice: Subject to any disclaimer, the term of this patent is extended or adjusted under 35 U.S.C. 154(b) by 0 days.

(21) Appl. No.: 10/188,228

(22) Filed: Jul. 2, 2002

(65) Prior Publication Data

US 2004/0003483 A1 Jan. 8, 2004

(51) Int. Cl.$^7$ .............................................. B60B 33/08
(52) U.S. Cl. ........................... 16/42 R; 16/24; 16/18 R
(58) Field of Search ............................ 16/18 R, 42 R, 16/21, 24–28

(56) References Cited

U.S. PATENT DOCUMENTS

| | | | | |
|---|---|---|---|---|
| 1,542,231 A | * | 6/1925 | Garfield | 16/24 |
| 2,767,420 A | * | 10/1956 | Riccio | 16/24 |
| 3,559,802 A | | 2/1971 | Eidus | |
| 3,739,894 A | * | 6/1973 | Hinman | 193/35 MD |
| 3,744,083 A | * | 7/1973 | Jenkins | 16/26 |
| 3,767,420 A | * | 10/1973 | Kim | 426/77 |
| 3,797,067 A | * | 3/1974 | Rodgers | 16/223 |
| 3,893,700 A | | 7/1975 | Dunmyer | |
| 4,203,177 A | * | 5/1980 | Kegg et al. | 16/24 |
| 4,285,550 A | * | 8/1981 | Blackburn et al. | 384/49 |
| 4,382,637 A | * | 5/1983 | Blackburn et al. | 384/49 |
| 4,400,032 A | * | 8/1983 | dePolo | 297/344.24 |
| 5,136,751 A | * | 8/1992 | Coyne et al. | 16/29 |
| 5,172,482 A | | 12/1992 | Coleman | |
| 5,219,058 A | * | 6/1993 | Sundseth | 193/35 MD |
| 5,379,485 A | * | 1/1995 | Oshins et al. | 16/24 |
| 5,626,353 A | * | 5/1997 | Campbell | 280/47.35 |
| 5,634,240 A | * | 6/1997 | Brokaw | 16/30 |
| 6,038,734 A | * | 3/2000 | Facchin | 16/24 |
| 6,134,747 A | * | 10/2000 | Leibman | 16/24 |

FOREIGN PATENT DOCUMENTS

| | | | | |
|---|---|---|---|---|
| DE | 3619875 A1 | * | 12/1987 | B60B/33/08 |
| JP | 58141901 A | * | 8/1983 | B60B/33/00 |
| JP | 06106907 A | * | 4/1994 | B60B/33/00 |

* cited by examiner

Primary Examiner—Heather Shackelford
Assistant Examiner—Michael J. Kyle
(74) Attorney, Agent, or Firm—Randy L. Canis; Greensfelder, Hemker & Gale, P.C.

(57) ABSTRACT

A caster assembly for supporting an article comprising a housing, a ball bearing, and a bearing retaining member, wherein the housing has a bore extending completely through a central region thereof such that a first opening and a second opening are created on opposite faces of the housing, the first opening defining an annular inner shoulder with a reduced diameter, the ball bearing having a diameter slightly less than a diameter of the bore such that the ball bearing is adapted to rotate within the bore, the diameter of the annular inner shoulder at the first opening being less than the diameter of the ball bearing to allow partial emergence of the ball bearing from the first opening yet preventing the ball bearing from completely exiting the first opening, the bearing retaining member being affixed to the housing at the second opening to retain the ball bearing within the bore.

14 Claims, 1 Drawing Sheet

MINI-BALL BEARING CASTER

BACKGROUND OF THE INVENTION

1. Field of the Invention

The present invention relates to casters, and more particularly to casters used to facilitate movement and relocation of articles. Casters are affixed upon each corner of an article (e.g., a caster on each of four corners) such that a load on a set of casters is balanced. More specifically, the present invention relates to an easy to manufacture, affix and use caster that may be used with a variety of articles including furniture, appliances, computer components and other articles.

2. Prior Art

Casters are well-known in the art for facilitating movement and relocation of various-sized articles for a variety of applications. Known caster designs are typically affixed to an article by its manufacturer prior to use of the article by a consumer or end-user. An example of a caster design that is installed during the article's manufacturing process is disclosed in U.S. Pat. No. 5,136,751 to Coyne et al. entitled "Wheel Assembly".

Often times in the art it is desirous to utilize a sphere instead of a wheel for the caster design to facilitate ease of movement in any direction on a horizontal surface without changing the orientation of the caster. Moreover, spherical caster design art is typically less complex and expensive to manufacture because they consist of fewer parts. An example of a spherical caster design is disclosed in U.S. Pat. No. 3,893,700 to Dunmyer entitled "Mobile Device". The caster design of Dunmyer utilizes a spherical caster to facilitate movement. Its construction is comprised of a caster body and a sphere retained in a circular horizontal groove within a recess of the caster body by use of a ball bearing ring that locks onto the recess.

Other caster designs are configured to be attached to an article after the article's manufacturing process. The caster design disclosed in U.S. Pat. No. 3,559,802 to Eidus entitled "Caster Assembly" describes a caster that may be easily added to an article by use of adhesive, as opposed to the use of a screw, bolt or other fastening device. The Eidus caster design utilizes a ball bearing retained within a caster block by use of a separate retaining ring through which the ball bearing extends. In another described embodiment, the caster block and retaining ring are made integral, wherein the spherical opening of the caster block flexes to accept the ball bearing.

Therefore, there appears a need in the art for an easy to manufacture, easy to use caster that is reliable and avoids the problems of the known art. There is also a need in the art for a caster that is simple in construction and easy to manufacture.

OBJECTS AND SUMMARY OF THE INVENTION

Accordingly, the primary object of the present invention is to provide a multi-purpose caster that is durable, inexpensive to manufacture, easy to affix to an article, and easily facilitates movement of the article.

Another object is to provide a caster that may be attached to an article by use of an adhesive to provide means for movement of the article.

Yet another object is to provide a multi-purpose caster that may be easily manufactured using conventional techniques of injection molding.

Still another object is to provide an inexpensive method to manufacture and assemble a multi-purpose caster.

These and other objects of the present invention are realized in the preferred embodiment of the present invention, described by way of example and not by way of limitation, which provides for a caster assembly for supporting an article comprising a housing, a ball bearing and a bearing retaining member.

In brief summary, the present invention overcomes and substantially alleviates the deficiencies in the prior art by providing a caster comprising a housing with an inflexible opening and a bearing retaining member, both of which retain a ball bearing within a bore of the caster housing.

Additional objects, advantages and novel features of the invention will be set forth in the description which follows, and will become apparent to those skilled in the art upon examination of the following more detailed description and drawings in which like elements of the invention are similarly numbered throughout.

DETAILED DESCRIPTION OF THE INVENTION

Figure 1:
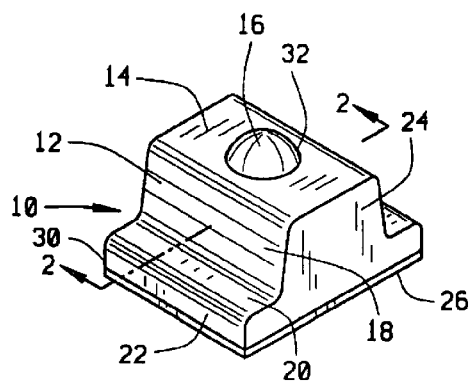
FIG. 1 is a perspective view of a caster in accordance with the present invention.

Referring to the drawings, the preferred embodiment of the caster of the present invention is illustrated and generally indicated as 10 in FIG. 1. Caster 10 may comprise a basic housing 12. Housing 12, as shown in FIG. 1, is preferably of a stepped shape, wherein principal top surface 14 is not flush with extension top surface 20 but rather is interrupted by principal side wall 18. The non-rectangular design of the present invention saves material cost while keeping optimal surface area on the faces of housing 12. Principal side wall 18, in its preferred embodiment as shown in FIG. 1, may be observed to be at an inclined angle on its exterior side of 15 degrees from the perpendicular of its intersection with extension top surface 22. However, the inclined angle of housing side wall 24 may vary from 0 to 45 degrees depending on application use and desired ornamental design; for example, principal side wall 18 may be perpendicular to extension top surface 20. An angle of 15 degrees is preferred because ideally housing 12 consists of an optimal amount of material while still retaining a durable shape.

Housing side wall 24 is shown in FIG. 1 as being perpendicular to principal top surface 14. Housing side wall 24 may alternatively be at an angle of less than 90 degrees, or as a further alternative, flush with portions of housing 12 (e.g., principal top surface 14) so that housing 12 is in a decorative design such as a star, sphere or oblong rectangle. Housing 12 may also be rectangular in shape as principal top surface 14 is flush with extension top surface 20 so as to form a continuous top surface, and principal side wall 18 is flush with extension side wall 22 so as to form a continuous side wall.

A portion of ball bearing 16 may be observed protruding from housing 12 in FIG. 1. Ball bearing 16 is preferably composed of chrome-plated steel and of a type commonly available so as not incur significant materials cost during assembly of the present invention. However, it will be appreciated in the art that ball bearing 16 may be of other materials commonly substituted for ball bearings that are capable of use with the present invention, including stainless steel, glass, plastic, and vulcanized rubber. However, chrome-plated steel is the preferred material for the present invention because it generates an optimal amount of friction between ball bearing 16 and bearing retaining member 28 enabling caster 10 to move smoothly along a surface when a small force is applied to the corresponding article and to cease movement of the article when the force is no longer applied.

Figure 5:
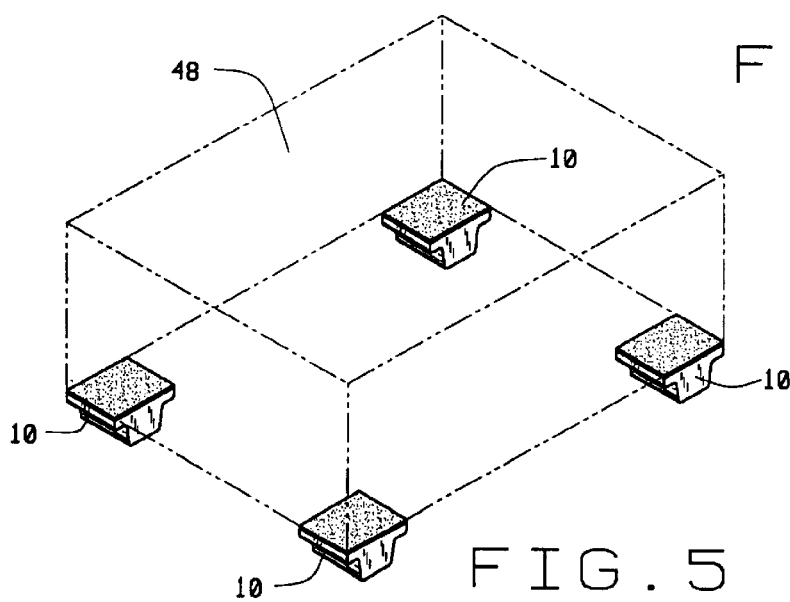
FIG. 5 is a perspective view of a caster in use on an article in accordance with the present invention.

An adhesive or alternate connection means, such as adhesive tape 26 preferably of the double-sided variety, is shown in FIG. 1 attached to caster 10 at housing underside 30. Adhesive tape 26 may cover all or a portion of housing underside 30 so as to provide sufficient tackiness to attach caster 10 to an article (as shown in FIG. 5). However, the present invention may use other means of affixing caster 10 to a desired article including by use of a hook and loop material such as Velcro®, or by use of screws or nails through housing 12. It will be appreciated that the use of adhesive tape 26 with the present invention provides the easiest means for caster affixation.

Figure 2:
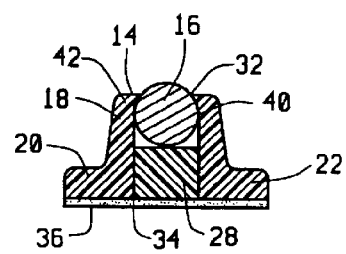
FIG. 2 is a cross-sectional view of a caster taken along line 2—2 in FIG. 1 in accordance with the present invention.

Turning now to FIG. 2, a cross section of caster 10 may be viewed. Evident are various portions of housing 12 including principal top surface 14, principal side wall 18, extension top surface 20 and extension side wall 22. Ball bearing 16 may be observed to be retained in bore 40 of housing 12. Bore 40 is of sufficient diameter to accept and retain ball bearing 16 so that it is able to freely rotate within bore 40.

First opening 32 may be observed to have protruding ball bearing 16. The diameter of first opening 32 is smaller than the diameter of ball bearing 16 so as to retain ball bearing 16 within bore 40. Bore 40 is configured to have shoulders 42 at the interior of first opening 32 to provide an annular seat in which to retain ball bearing 16.

A bearing retaining member in the form of plug 28 may be used to seal housing 12. Plug 28 as shown in FIG. 2 presses against ball bearing 16 so as to retain it within bore 40 and seated against shoulders 42 so that a portion of ball bearing 16 is exposed outside of housing 12. Plug 28 is preferably flush with housing underside 30, so that adhesive tape 26 has a continuous surface to cover. Plug 28 is preferably made of the same material as housing 12, and may be constructed of plastic through known plastic molding techniques.

Housing 12, as well as plug 28, is preferably plastic and constructed by a plastic molding process, as would be understood by those having skill in the art. An example of this manufacturing process for housing 12 is as follows: First, two molding plates are milled out to the dimensions of housing 12 to form a mold cavity with a stationary and movable molding plate. The smallest side of the caster, principal top surface 14 in the preferred embodiment, is entered the furthest inside part of the mold cavity toward the movable side so that housing 12 can be ejected from the mold cavity. When the mold is closed, melted plastic is injected through the stationary side of the mold to fill the mold cavity. Housing 12 is allowed a short period of time to cool. Thereafter, the movable side of the mold opens and the finished housing 12 is ejected. Plug 28 may be constructed via a similar method as will be appreciated in the art.

However, housing 12 and plug 28 may also be manufactured by a milling machine process, as would be understood by those having skill in the art. An example of this manufacturing process for housing 12 is as follows: The manufacturer first obtains an industry standard piece of rectangular plastic stock. The mill head of the milling machine is set to 15 degrees, and the plastic stock is aligned with the mill bit (contained within the mill head) and set for a proper cut. One side of the plastic stock is milled, and then the plastic stock is then rotated 180 degrees in the milling machine and cut on the opposite side thereby defining principal top surface 14 and principal side wall 18. The mill head is then reset to 0 degrees, and the excess material is milled off of the stock so that extension top surface 20 is perpendicular to the principal top surface 14 as shown in FIG. 2. The plastic stock is then cut into pieces, each piece forming an individual housing 12. The pieces of plastic stock are then milled on extension side walls 22 so that housing 12 has the final desired dimensions.

The mill bit in the milling machine is then changed to a roundover bit so that bore 40 may be drilled in housing 12. Next, the drilling configuration of the milling machine is set so that bore 40 will be drilled to a preset depth within housing 12 such that the bit will partially pierce through the side of housing 12 to create first opening 32 and shoulders 42. Housing 12 is then placed on the mill table against a stop such that housing 12 may be automatically centered and drilled to the desired preset depth. When the roundover bit is removed from housing 12, bore 40 and shoulders 42 may be observed. Thereupon, the manufacturing of housing 12 in this alternate manufacturing technique is complete for use with the present invention.

Figure 3:
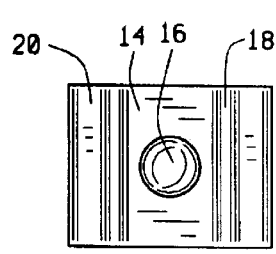
FIG. 3 is a plan view of a caster from the prospective of the side from which the ball bearing emerges from the caster in accordance with the present invention.

FIG. 3 provides a plan view of the present invention from the prospective of the side of caster 10 from which ball bearing 16 emerges. Principal top surface 14, ball bearing 16, principal side wall 18 and extension side wall 22 may be observed from this view.

Figure 4:
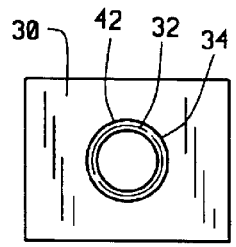
FIG. 4 is a plan view of a main body of a caster without a ball bearing and bearing retaining member from the prospective of the side opposite the side shown in FIG. 3 in accordance with the present invention.

FIG. 4 provides a plan view of housing 12 from the perspective of housing underside 30 of the present invention without ball bearing 16, plug 28, or adhesive tape 26. The view of FIG. 4 more clearly shows shoulders 42 of first opening 32, and the contrast of the diameter of first opening 32 and second opening 34.

Caster 10 be may observed in FIG. 5 with its intended use affixed to an article 48. Four casters 10 may be observed to be affixed to the underside of article 48 so as to provide the benefits of the present invention.

Figure 6:
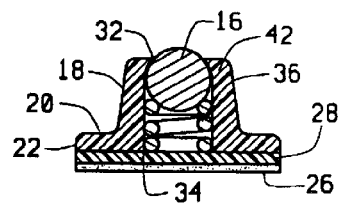
FIG. 6 is a cross-sectional view of a caster taken along line 2—2 in FIG. 1 in accordance with an alternate embodiment of the present invention.

Another embodiment of the present invention may be observed in FIG. 6 using an alternative bearing retaining member. Instead of using plug 28 (see FIG. 2) to retain ball bearing 16 within bore 42, the alternate embodiment of the present invention uses biasing member 36 and plate 38. Biasing member 36 is shown in FIG. 6 as a spring. Biasing member 36 is inserted into bore 42 and is retained within bore 42 by use of plate 38. Plate 38 is affixed to housing underside 30, thereby providing a flush surface for which to affix adhesive tape 26. Plate 38 is preferably of the same dimensions as main body underside 30, but may be larger or smaller depending upon the desired application of the present invention.

It should be understood from the foregoing that, while particular embodiments of the invention have been illustrated and described, various modifications can be made thereto without departing from the spirit and scope of the invention. Therefore, it is not intended that the invention be limited by the specification; instead, the scope of the present invention is intended to be limited only by the appended claims.

What is claimed is:

1. A caster assembly for supporting an article comprising:
   (a) a housing,
   (b) a solid non-compressible ball bearing,
   (c) a flat bearing plug, and
   (d) a means for affixing the caster assembly to the article,
   said housing being monolithic and having a bore extending completely through a central region thereof such that a first opening and a second opening are created on opposite faces of said housing, said first opening defining an annular inner shoulder with a reduced diameter,
   said solid non-compressible ball bearing having a diameter nearly approximating that of a diameter of said bore such that said solid non-compressible ball bearing substantially engages an entire circumferential wall of said bore and said inner annular shoulder and is adapted to rotate within said bore and said inner annular shoulder, said diameter of said annular inner shoulder at said first opening being less than said diameter of said solid non-compressible ball bearing to allow partial emergence of said solid non-compressible ball bearing from said first opening yet preventing said solid non-compressible ball bearing from completely exiting said first opening,
   said flat bearing plug being completely retained within said bore at said second opening on a housing underside such that the flat bearing plug is flush with the housing underside and in direct frictional contact with said solid non-compressible ball bearing to retain said solid non-compressible ball bearing within said bore and said inner annular shoulder.

2. The article of claim 1, wherein said housing is comprised of an inflexible material.

3. The article of claim 1, wherein said housing is comprised of molded plastic.

4. The article of claim 1, wherein means for affixing the caster assembly to the article comprises an adhesive.

5. The article of claim 1, wherein means for affixing the caster assembly to the article comprises one or more nails.

6. The article of claim 1, means for affixing the caster assembly to the article comprises one or more screws.

7. The article of claim 1, wherein means for affixing the caster assembly to the article comprises hook and loop material.

8. A method for manufacturing a caster assembly, said method comprising the steps of:
   (a) providing a monolithic housing for forming a body for said caster,
   (b) creating a bore within said housing,
   (c) creating an internal annular shoulder of lessened diameter within, and at a first end of, said bore within said housing,
   (d) placing a solid non-compressible ball bearing having a diameter nearly approximating that of a diameter of said bore such that said solid non-compressible ball bearing substantially engages an entire circumferential wall of said bore and said internal annular shoulder and is adapted to rotate within said bore and said internal annular shoulder,
   (e) sealing said solid non-compressible ball bearing completely within said bore by inserting a flat bearing plug within a second end of said bore at a housing underside such that the bearing plug is flush with the housing underside, and
   (f) providing means on said housing at said flat bearing plug for adapting said housing to be affixed to a surface of an article,
   said bore being extended completely through a central region of said housing such that a first opening and a second opening are created on opposite faces of said housing, inserting said solid non-compressible ball bearing into said bore through said second end such that said solid-non-compressible ball bearing rests against said internal annular shoulder and a portion of said solid non-compressible ball bearing protrudes through said first opening, said solid non-compressible ball bearing having a dimension adapted to permit free rotation within said bore and said internal annular shoulder.

9. The method of claim 8, wherein the method of creating a bore within said housing is by use of plastic molding.

10. The method of claim 8, wherein the method of creating a bore within said housing is by use of a milling machine.

11. The method of claim 8, wherein means for affixing the caster assembly to the article comprises an adhesive.

12. The method of claim 8, wherein means for affixing the caster assembly to the article comprises one or more nails.

13. The method of claim 8, means for affixing the caster assembly to the article comprises one or more screws.

14. The method of claim 8, wherein means for affixing the caster assembly to the article comprises hook and loop material.

* * * * *